Figure 1:
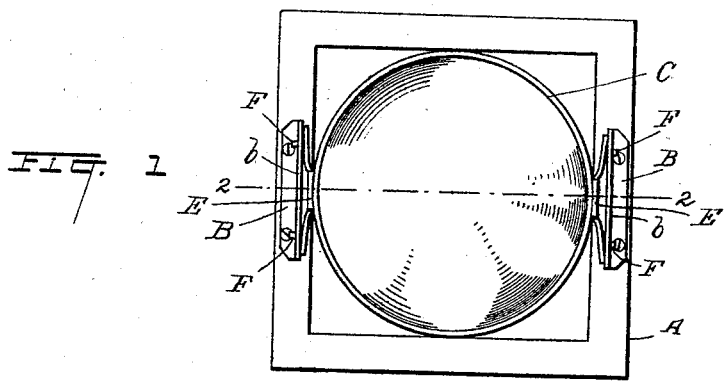

No. 668,416. Patented Feb. 19, 1901.
F. R. ROACH.
LENS ATTACHMENT FOR CAMERAS.
(Application filed June 29, 1900.)
(No Model.)

WITNESSES
Edward Bell
F. A. Stewart

INVENTOR
Frank R. Roach
BY Edgar Saleff
ATTORNEYS

UNITED STATES PATENT OFFICE.

FRANK ROWELL ROACH, OF GARDNER, MASSACHUSETTS.

LENS ATTACHMENT FOR CAMERAS.

SPECIFICATION forming part of Letters Patent No. 668,416, dated February 19, 1901.

Application filed June 29, 1900. Serial No. 22,055. (No model.)

*To all whom it may concern:*

Be it known that I, FRANK ROWELL ROACH, a citizen of the United States, residing at Gardner, in the county of Worcester and State of Massachusetts, have invented certain new and useful Improvements in Attachments for Cameras, of which the following is a full and complete specification, such as will enable those skilled in the art to which it appertains to make and use the same.

This invention relates to attachments for cameras; and the object thereof is to provide an improved device of this class which may be connected with or secured in any camera and which is designed for use in copying photographs and other pictures and for taking pictures of various articles and animals life-size or larger, if desired; also, for making transparencies, copies of negatives of the same, and for other and similar purposes.

The invention is fully disclosed in the following specification, of which the accompanying drawings form a part, in which the separate parts of my improvement are designated by the same reference characters in each of the views, and in which—

Figure 2:
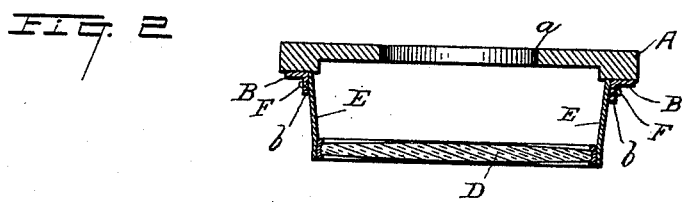
Figure 3:
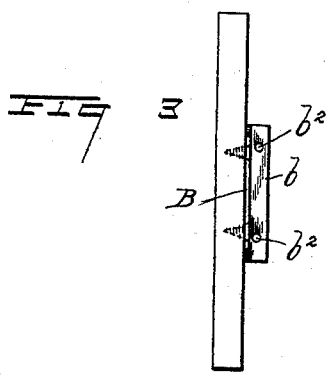
Figure 4:
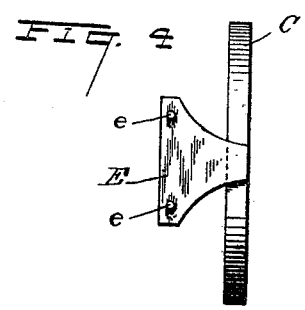

Figure 1 is a front view of my improved attachment for cameras and showing the method of securing it within the camera; Fig. 2, a section on the line 2 2 of Fig. 1; Fig. 3, a side view of the head or frame of the camera and showing the means connected therewith for securing my improved attachment in place, and Fig. 4 a side view of the attachment complete.

In the drawings forming part of this specification I have shown at A an ordinary head or framework of a camera in which the lens-tube is placed, the opening for the same being shown at $a$, and in the practice of my invention I secure to the opposite sides of the head or frame A angular cleats B, which are L-shaped in cross-section and provided with an outwardly-directed flange $b$, in which are formed holes or openings $b^2$.

The attachment proper consists of an annular band C, in which is placed a lens D, and secured to the opposite sides of the annular band are spring-clips E, the free ends of which are elongated and provided with outwardly-directed lugs or pins $e$, designed to enter the holes or openings $b^2$ in the flanges $b$ of the cleats B, as shown at F in Figs. 1 and 2.

The attachment is so formed and connected that the lens D is on the inner side of the head or frame of the camera, which carries the regular lens-tube, and the lens D may be set at any desired distance from the lens or lenses in said tube, the latter being not shown. The lens D may be detached at any time from the camera by simply pressing inwardly on the spring-clips E, and, as will be apparent, said lens may be reattached whenever necessary by reversing this operation.

By means of this device I am enabled to copy photographs or other pictures full size or enlarge the same, also to make pictures of various objects full size and of animals life-size or larger, and also to make transparencies and copies of negatives of the same.

This device is simple in construction and operation and comparatively inexpensive, and it will be apparent that changes in and modifications of the construction described may be made without departing from the spirit of my invention or sacrificing its advantages.

Having fully described my invention, I claim as new and desire to secure by Letters Patent—

1. The combination with the head or frame of a camera, of cleats secured thereto, and an attachment consisting of a lens mounted in an annular band provided with spring side clips adapted to be connected with said cleats, substantially as shown and described.

2. An attachment for cameras, consisting of a lens mounted in an annular band, provided with spring side clips adapted to be connected with the head or frame of the camera, and to be supported within the camera at a predetermined distance from said head or frame, substantially as shown and described.

3. An attachment for cameras, comprising an annular band, a lens mounted therein, spring side clips connected with said band, and means for connecting said clips with the head of the frame of the camera, substantially as shown and described.

In testimony that I claim the foregoing as my invention I have signed my name, in presence of the subscribing witnesses, this 21st day of June, 1900.

FRANK ROWELL ROACH.

Witnesses:
 FRED A. RUSCH.
 WILLIAM L. DURST.